United States Patent Office 3,399,243
Patented Aug. 27, 1968

3,399,243
CATALYTIC SYNTHESIS OF VINYLAROMATICS WITH COS
Donald E. Boswell, Yardley, Pa., assignor to Mobil Oil Corporation, a corporation of New York
No Drawing. Filed Dec. 20, 1966, Ser. No. 603,128
6 Claims. (Cl. 260—669)

ABSTRACT OF THE DISCLOSURE

Catalytic process for dehydrogenating alkylaromatic compounds (e.g., ethylbenzene) by reaction with carbonyl sulfide, at 300–700° C., in the presence of alumina or a Group II–A metal oxide to form the corresponding vinylaromatic compound (e.g., styrene), precursors for making polystyrene.

BACKGROUND OF THE INVENTION

This invention relates to the manufacture of styrenes, i.e., styrene and substituted derivatives. It is more particularly concerned with a catalytic process for producing styrenes by dehydrogenating the corresponding alkylaromatic compound.

As is well known to those familiar with the art, styrene has been produced by various dehydrogenation methods, both pyrolytic and catalytic. Thus, a current commercial process involves catalytic dehydrogenation of ethylbenzene in the presence of a large molar excess of steam. Generally, the process is operated at a relatively low yield per pass in the order of about 37% with an ultimate yield of about 86%. In a pyrolytic process using dehydrogenating compounds (e.g. U.S. Patent No. 1,997,967), the maximum ultimate yield obtained was about 52%. It is highly desirable, as will be appreciated, to achieve ultimate yields approaching 100%, while operating at relatively high conversions per pass.

SUMMARY OF THE INVENTION

It has now been found that styrenes, useful in making polystyrenes, can be produced in high yields at a relatively high rate of conversion per pass, by a process that is simple and economically feasible. It has been discovered that, in the presence of certain metal oxide catalysts, styrenes can be produced by the catalytic dehydrogenation of alkylaromatic compounds with carbonyl sulfide or suitable precursors thereof which will form carbonyl sulfide in situ.

This invention provides a method for producing styrene and substituted derivatives thereof that comprises contacting carbonyl sulfide and an alkylaromatic compound reactant having the formula:

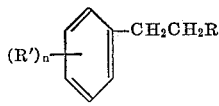

wherein R is hydrogen or lower alkyl ($C_1$–$C_4$), R' is selected from the group consisting of lower alkyl ($C_1$–$C_4$), halogen, cyano, and aromatic, and $n$ is 0 to 3, with a catalyst selected from the group consisting of alumina and Group II–A metal oxides.

DESCRIPTION OF SPECIFIC EMBODIMENTS

The alkylaromatic compound reactant is an alkylbenzene having the aforedefined formula. As indicated above, the alkylaromatic compound reactant can contain one or more substituent groups on the benzene ring. Non-limiting examples of the alkylaromatic compound reactant are ethylbenzene; butylbenzene; 4-methylisopropylbenzene; (3-methylbutyl)benzene; hexylbenzene; 3-chloro-ethylbenzene; 4-bromo-propylbenzene; 3,4-dichloroisopropylbenzene; 2-methyl-5-phenyl-ethylbenzene; 5-cyanoethylbenzene; and 2,4,6-trimethyl-ethylbenzene. The ethylbenzenes, which can have a substituent or substituents R' as aforedefined, are preferred alkylaromatic compound reactants.

The exact role played by carbonyl sulfide in the process of this invention has not been ascertained. It may be postulated, however, that it serves as a dehydrogenation agent. Sulfur-containing compounds which form carbonyl sulfide in situ, such as hydrogen sulfide and carbon monoxide, may be used in the process of this invention. Accordingly, throughout the specification and claims, "carbonyl sulfide" is embracive of carbonyl sulfide whether formed outside the reactor or in situ.

It appears that one mole of carbonyl sulfide per mole of alkylaromatic compound reactant is consumed in the reaction. Thus, it is desirable to use a molar excess of carbonyl sulfide. In general, the molar ratio of carbonyl sulfide to alkylaromatic compound reactant can be between 1:1 and 5:1.

The catalysts used in the process of this invention are alumina and the oxides of the metals of Group II–A of the Periodic Chart of the Elements, i.e. Be, Mg, Ca, Sr, and Ba. Magnesium oxide (magnesia) is a particularly preferred catalyst. The Periodic Chart of the Elements referred to is that on pages 56 and 57 of Lange's "Handbook of Chemistry," ninth edition, 1956, Handbook Publishers, Inc., Sandusky, Ohio.

The process of this invention can be carried out batchwise, but it is more feasible to use a continuous operation. The temperatuer employed can be between about 300° C. and about 700° C. It is generally preferred to operate between about 500° C. and about 600° C. The liquid hourly space velocity (LHSV-liquid volume alkylaromatic compound reactant charged per volume of catalyst per hour) will be between about 0.1 and about 20 and is, as is well known, correlative with the temperature. The process proceeds readily to good yields at atmospheric pressure, but sub-atmospheric or superatmospheric pressures can be used.

Example 1

A series of runs was carried out at various temperatures and at atmospheric pressure, using a catalyst bed of magnesia heated to the desired run temperature. Prior to use, the catalyst was calcined at 600° C. for 0.5 hr. under a nitrogen atmosphere. In each run, ethylbenzene was charged at an LHSV of 0.5 and carbonyl sulfide was charged in a molar ratio of 3.77 moles carbonyl sulfide per mole ethylbenzene. Pertinent data are set forth in Table I.

TABLE I

| Temp., ° C. | Percent conversion | Percent styrene | Percent ultimate yield [1] |
|---|---|---|---|
| 400 | 5.0 | 4.0 | 80 |
| 500 | 19.2 | 18.5 | 96 |
| 600–1 [2] | 59.3 | 58.8 | 99 |
| 600–2 | 60.5 | 60.0 | 99 |
| 900–3 | 61.9 | 61.5 | 99 |
| 600–4 | 65.9 | 65.5 | 99 |
| 600–5 | 67.0 | 66.6 | 99 |
| 600–5 | 59.0 | 58.7 | 99 |
| 600–7 | 60.0 | 59.5 | 99 |
| 600–8 | 53.6 | 55.2 | 99 |

[1] The ultimate yield is the amount of styrene expected if ethylbenzene is recycled to extinction.
[2] The samples at 600° were taken at regular intervals over a total period of 2.8 hrs.

Example 2

A series of runs was carried out, as described in Example 1, except that isopropylbenzene (cumene) was used in place of ethylbenzene and molar ratio of carbonyl sulfide to cumene was 4.3:1. Pertinent data are set forth in Table II.

TABLE II

| Temp., °C. | Percent conversion | α-methylstyrene | Percent ultimate yield [2] |
|---|---|---|---|
| 400 | 10.0 | 9.9 | 99 |
| 500 | 56.0 | 55.7 | 99 |
| 600-1 [1] | 74.0 | 73.6 | 99 |
| 600-2 | 76.0 | 75.5 | 99 |
| 600-3 | 69.2 | 68.8 | 99 |
| 600-4 | 68.5 | 68.0 | 99 |
| 600-5 | 67.0 | 66.5 | 99 |
| 600-6 | 61.5 | 61.0 | 99 |
| 600-7 | 55.5 | 55.0 | 99 |
| 600-8 | 49.0 | 48.8 | 99 |

[1] The samples at 600° were taken at regular intervals during 4.25 hrs.
[2] Ultimate yield is the amount of α-methylstryene expected if cumene is recycled to extinction.

From the data in Tables I and II, it will be apparent that carbonyl sulfide in the presence of magnesia effectively converts ethylbenzene and cumene to, respectively, styrene and α-methylstyrene. Favorable rates of conversion occur at 500–600° C. and selectivity is extremely high.

Example 3

A series of runs was carried out, as described in Example 1, except alumina was used as the catalyst in place of magnesia. Pertinent data are set forth in Table III.

TABLE III

| T. (° C.) | Percent conversion | Percent benzene | Percent toluene | Percent benzothiophene | Percent styrene | Percent ultimate yield of styrene |
|---|---|---|---|---|---|---|
| 200 | 0 | 0 | 0 | 0 | 0 | 0 |
| 300 | Trace | 0 | 0 | 0 | Trace | |
| 400 | 12.3 | Trace | Trace | Trace | 12.2 | 99 |
| 500 | 64.4 | Trace | 3.2 | 16.7 | 42.5 | 66 |
| 600-1 [1] | 94.6 | 3.1 | 6.5 | 66.3 | 18.6 | 20 |
| 600-2 | 93.3 | 1.8 | 5.4 | 53.2 | 32.8 | 35 |
| 600-3 | 91.8 | 1.7 | 5.6 | 32.2 | 52.1 | 57 |
| 600-4 | 90.1 | 1.5 | 5.5 | 21.5 | 61.0 | 68 |
| 600-5 | 87.9 | 1.3 | 4.6 | 16.3 | 65.5 | 75 |
| 600-6 | 85.0 | 1.1 | 3.6 | 13.5 | 66.7 | 79 |
| 600-7 | 78.2 | 0.7 | 2.6 | 8.5 | 66.2 | 85 |
| 600-8 | 74.4 | 0.6 | 2.1 | 5.9 | 65.7 | 88 |

[1] The samples at 600° were taken at regular intervals during 3.8 hrs.

From the data in Table III, it will be noted that, although the selectivity is high at 400° C. but at low conversion rates, selectivity dropped at higher temperatures. The alumina used in these runs, however, was a commercial catalyst that contained a very small amount (in the order of 0.1 weight percent) of silica. The small amount of silica would form acidic sites, which would account for the formation of by-products. It will be noted that as the catalyst aged (and thus became less acidic) the selectivity increased. Thus, if a pure alumina, such as can be formed from an aluminum alcoholate by known methods, is used it would be expected that higher selectivity will be achieved.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

I claim:
1. A method for producing styrene and substituted derivatives thereof that comprises contacting carbonyl sulfide and an alkylaromatic compound reactant having the formula:

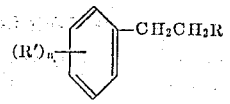

wherein R is hydrogen or lower alkyl ($C_1$–$C_4$), R' is selected from the group consisting of lower alkyl ($C_1$–$C_4$), halogen, cyano, and aromatic, and n is 0 to 3, with a catalyst selected from the group consisting of alumina and Group II–A metal oxides.

2. The process defined in claim 1, wherein said catalyst is magnesia.

3. The process defined in claim 1, wherein said catalyst is alumina.

4. The process defined in claim 2, wherein said alkylaromatic compound reactant is ethylbenzene.

5. The process defined in claim 2, wherein said alkylaromatic compound reactant is cumene.

6. The process defined in claim 3, wherein said alkylaromatic compound reactant is ethylbenzene.

No references cited.

DELBERT E. GANTZ, *Primary Examiner.*

C. R. DAVIS, *Assistant Examiner.*

UNITED STATES PATENT OFFICE
CERTIFICATE OF CORRECTION

Patent No. 3,399,243                            August 27, 1968

Donald E. Boswell

It is certified that error appears in the above identified patent and that said Letters Patent are hereby corrected as shown below:

Column 2, line 31, "temperatuer" should read -- temperature --; TABLE I, first column, line 5 thereof, "900-3" should read -- 600-3 --; same table, first column, line 8 thereof, "600-5" should read -- 600-6 --.

Signed and sealed this 3rd day of February 1970.

(SEAL)
Attest:

Edward M. Fletcher, Jr.                      WILLIAM E. SCHUYLER, JR.
Attesting Officer                                 Commissioner of Patents